(12) United States Patent
Gao et al.

(10) Patent No.: US 10,714,988 B2
(45) Date of Patent: Jul. 14, 2020

(54) PERMANENT MAGNET DESIGN TO ENABLE HIGHER MAGNETIC FLUX DENSITY

(71) Applicant: UCHICAGO ARGONNE, LLC, Chicago, IL (US)

(72) Inventors: Kaizhong Gao, North Oaks, MN (US); Yuepeng Zhang, Willowbrook, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 246 days.

(21) Appl. No.: 15/685,638

(22) Filed: Aug. 24, 2017

(65) Prior Publication Data

US 2019/0068008 A1 Feb. 28, 2019

(51) Int. Cl.

| | |
|---|---|
| *H02K 1/02* | (2006.01) |
| *H02K 1/06* | (2006.01) |
| *H02K 1/27* | (2006.01) |
| *H01F 7/02* | (2006.01) |
| *H02K 1/17* | (2006.01) |
| *H01F 1/057* | (2006.01) |
| *H02K 1/14* | (2006.01) |
| *H01F 1/053* | (2006.01) |

(52) U.S. Cl.
CPC .............. *H02K 1/02* (2013.01); *H01F 1/057* (2013.01); *H01F 7/021* (2013.01); *H01F 7/0278* (2013.01); *H02K 1/06* (2013.01); *H02K 1/17* (2013.01); *H01F 1/053* (2013.01); *H01F 7/0273* (2013.01); *H02K 1/143* (2013.01); *H02K 1/27* (2013.01)

(58) Field of Classification Search
CPC ............ H02K 1/02; H02K 1/17; H02K 1/141; H02K 1/143; H02K 1/00; H02K 1/06; H02K 1/14; H02K 1/27; H01F 1/057; H01F 1/10; H01F 7/021; H01F 7/0278; H01F 1/03; H01F 1/053; H01F 7/00; H01F 7/02; H01F 7/0273
See application file for complete search history.

(56) References Cited

U.S. PATENT DOCUMENTS

| | | | | |
|---|---|---|---|---|
| 3,768,054 A | * | 10/1973 | Neugebauer | .......... H01F 7/0278 335/304 |
| 4,383,192 A | * | 5/1983 | Sikorra | .................. H02K 23/04 310/154.11 |
| 5,196,748 A | * | 3/1993 | Rigney | ............... F16C 32/0438 310/90.5 |

(Continued)

OTHER PUBLICATIONS

Rodewald et al., "Properties and Application of High Performance Magnets" (2004), <http://www.vacuumschmelze.com/fileadmin/documents/pdf/fipublikationen/Paper_HPMA_2004_ Magnets.pdf>.

(Continued)

*Primary Examiner* — Nguyen Tran
*Assistant Examiner* — David A. Singh
(74) *Attorney, Agent, or Firm* — Marshall, Gerstein & Borun LLP

(57) ABSTRACT

A hybrid permanent magnet includes a first magnet (M1) having a first magnetic material and a second magnet (M2) having a second magnetic material different from the first magnetic material. The M2 magnet is deposited or assembled on a north pole surface and/or a south pole surface of the M1 magnet and the volume of the M2 magnet is less than or equal to the volume of the M1 magnet.

16 Claims, 8 Drawing Sheets

(56) References Cited

U.S. PATENT DOCUMENTS

| | | | | |
|---|---|---|---|---|
| 5,492,571 A * | 2/1996 | Frosch | ............... | C21D 1/04 |
| | | | | 148/101 |
| 6,208,047 B1 * | 3/2001 | Agematsu | ............... | H02K 37/12 |
| | | | | 310/49.36 |
| 6,617,746 B1 * | 9/2003 | Maslov | ............... | H02K 1/141 |
| | | | | 310/429 |
| 8,405,479 B1 * | 3/2013 | Cleveland | ............... | H01F 7/0273 |
| | | | | 335/296 |
| 2004/0085062 A1 * | 5/2004 | Miyata | ............... | F02D 9/105 |
| | | | | 324/207.2 |
| 2005/0151539 A1 * | 7/2005 | Aoki | ............... | G01R 33/3806 |
| | | | | 324/318 |
| 2005/0242912 A1 * | 11/2005 | Chell | ............... | F25B 21/00 |
| | | | | 335/306 |
| 2009/0140591 A1 * | 6/2009 | Blessing | ............... | H02K 21/029 |
| | | | | 310/156.37 |
| 2010/0225114 A1 * | 9/2010 | Perner | ............... | F16C 32/0402 |
| | | | | 290/53 |
| 2010/0327689 A1 * | 12/2010 | Sakai | ............... | H02K 1/2766 |
| | | | | 310/156.03 |
| 2012/0126637 A1 * | 5/2012 | Ankeney | ............... | H02K 1/02 |
| | | | | 310/43 |
| 2013/0249343 A1 * | 9/2013 | Hunstable | ............... | H02K 1/17 |
| | | | | 310/177 |
| 2013/0313938 A1 * | 11/2013 | Yamada | ............... | H02K 1/2713 |
| | | | | 310/156.69 |
| 2014/0375160 A1 * | 12/2014 | Zhang | ............... | H02K 21/16 |
| | | | | 310/154.26 |
| 2015/0200573 A1 * | 7/2015 | Ogino | ............... | H02K 21/00 |
| | | | | 310/154.02 |
| 2017/0120401 A1 * | 5/2017 | Fullerton | ............... | B23P 15/001 |
| 2017/0123001 A1 * | 5/2017 | Chigullapalli | ............... | G01R 1/0483 |
| 2018/0053586 A1 * | 2/2018 | Rong | ............... | H01F 1/0579 |
| 2019/0148995 A1 * | 5/2019 | Tanaka | ............... | H02K 19/24 |
| 2019/0355500 A1 * | 11/2019 | Lee | ............... | H01F 27/245 |

OTHER PUBLICATIONS

Chen et al., Developments in the Processing and Properties of NdFeB-Type Permanent Magnets, Journal of Magnetism and Magnetic Materials, pp. 432-440 (Aug. 2002).

Jiang et al., "Improving exchange-spring nanocomposite permanent magnets," Applied Physics Letters, vol. 85, No. 22, pp. 5293-5295 (Nov. 29, 2004), <http://www.uta.edu/physics/research/jpliu/myweb/Publications/2004-1-APL.pdf>.

* cited by examiner

PERMANENT MAGNET DESIGN TO ENABLE HIGHER MAGNETIC FLUX DENSITY

STATEMENT REGARDING FEDERALLY SPONSORED RESEARCH OR DEVELOPMENT

This invention was made with government support under grant DE-AC02-06CH11357, awarded by the U.S. Department of Energy. The government has certain rights in the invention.

FIELD OF THE DISCLOSURE

The present disclosure relates to a novel permanent magnet technology and its use in high efficiency generators and motors.

BACKGROUND

Permanent magnets create their own persistent magnetic fields and are typically used in electromagnetic induction devices such as motors and generators. Permanent magnets are made from a magnetic material such as ferrite. Additional magnetic materials from rare earth metals, such as Samarium-Cobalt (SmCo), or Neodymium-Iron-Boron (NdFeB) have also been used. While an NdFeB magnet is stronger (e.g., according to maximum energy product $(BH)_{max}$) than an SmCo magnet which is stronger than ferrite, it becomes difficult to increase the magnetic strength even further and Neodymium magnets are much more expensive than ferrite due to the scarcity of Neodymium.

Moreover, a magnet is typically strongest at the surface of the magnet. The magnetization at the magnet surface then decreases with distance from the magnet surface due to a large self-demagnetization field generated by surface magnetic charges, thereby reducing the strength of the magnet away from the surface, such that the magnetic flux density decreases with distance from the magnet. Other various magnetic properties such as magnetic anisotropy, magnetic moment and thus magnetic flux density, etc. may decline as the operating temperature increases. Additionally, there are several grades of NdFeB, SmCo, ferrite, etc. magnets, where higher grades indicate stronger magnets. However, the cost of the magnet may increase in proportion with the grade.

The torque generated in an electromagnetic induction device, such as a motor is proportional to the magnetic flux density produced by a permanent magnet in the stator. As the magnetic flux density increases, the efficiency of the motor increases. This also applies to generators where the electric current and thus the generator efficiency increases in proportion to the magnetic flux density.

SUMMARY OF THE DISCLOSURE

The presently disclosed embodiments address many of the issues described above with respect to permanent magnets. The hybrid permanent magnets described herein address these disadvantages, having a high magnetic flux density at a reduced cost, thereby increasing the efficiencies of motors and generators that implement the hybrid permanent magnets. Additionally, the hybrid permanent magnets described herein may be optimized for particular magnetic properties, such as saturation magnetization ($M_S$), magnetic anisotropy ($K_u$), coefficient of temperature (CT) of magnetization, CT of Coercivity, Curie temperature ($T_C$), remanent magnetization ($M_r$), or Coercivity ($H_C$) based on the application in which a hybrid permanent magnet is utilized. For example, a motor in an electric vehicle may operate at a temperature of around 150° Celsius (C). Therefore, it may be desirable to have high magnetic flux densities at temperatures around 150° C. for a hybrid permanent magnet within an electric vehicle motor. On the other hand, a turbine may operate at a temperature of around 500° C., and thus it may be desirable for a hybrid permanent magnet in a turbine to have high magnetic flux densities at higher temperatures than in an electric vehicle motor. As such, the embodiments disclosed herein are suitable for use in consumer electronics, radio frequency (RF) communications, commercial applications, power generation applications, transportation applications, and nearly any application in which permanent magnets or more generally, a magnetic field are presently employed.

In an embodiment, a hybrid permanent magnet comprises a first magnet having a first magnetic material. The hybrid permanent magnet also includes a second magnet having a second magnetic material different from the first magnetic material, where the second magnet is assembled on a north pole surface or a south pole surface of the first magnet. The volume of the second magnet is less than or equal to a volume of the first magnet.

In various embodiments, the second magnet includes a north surface second magnet and a south surface second magnet, the north surface second magnet assembled on the north pole surface of the first magnet and the south surface second magnet assembled on the south pole surface of the first magnet. The first magnet may be a rectangular prism or cylindrical shaped and the second magnet(s) may be assembled on one end or two opposite ends of the rectangular prism or cylindrical shaped first magnet perpendicular to a polar axis of the first magnet. Moreover, the length of each of the second magnets may be ¹⁄₂₀ the length of the hybrid permanent magnet, the width of each of the second magnets may be equal to the width of the first magnet, and the height of each of the second magnets may be equal to the height of the first magnet. Furthermore, the first magnetic material may be a ferrite (such as Barium-Iron-Oxygen (Ba—Fe—O), Barium-Nickel-Iron-Oxygen (Ba—Ni—Fe—O), Barium-Strontium-Nickel-Iron-Oxygen (Ba—Sr—Ni—Fe—O), etc.), alnico (such as Aluminum-Nickel-Cobalt (Al—Ni—Co), Aluminum-Nickel-Cobalt-Iron (Al—Ni—Co—Fe), Aluminum-Nickel-Cobalt-Iron-Copper (Al—Ni—Co—Fe—Cu), etc.), rare earth-transition metal-based permanent magnetic materials X-Y or X-Y-Z (where X includes rare-earth elements and their combinations, such as Neodymium (Nd), Samarium (Sm), Gadolinium (Gd), Neodymium-Dysprosium (NdDy), Neodymium-Dysprosium-Terbium (NdDyTb), Neodymium-Dysprosium-Terbium-Gadolinium (NdDyTbGd), etc.; Y includes transition metal elements and/or their combinations, such as Iron (Fe), Cobalt (Co), Manganese (Mn), Nickel (Ni), Iron-Cobalt (FeCo), Iron-Cobalt-Nickel (FeCoNi), Iron-Cobalt-Nickel-Manganese (FeCoNiMn), etc.; and Z includes non-metal elements and/or other doping elements and their combinations, such as Boron (B), Silicon (Si), Carbon (C), Nitrogen (N), Copper (Cu), Silver (Ag), Zirconium (Zr), etc.), Mn-based permanent magnetic materials X-Y or X-Y-Z (where X includes Mn, Fe, Manganese-Iron (MnFe), etc.; and Y includes Bismuth (Bi), Al, Gallium (Ga), and/or other doping elements such as Praseodymium (Pr), as well as the combination of these elements), transition metal-platinum-based magnetic material X-Y (where X includes transition metal elements and/or their combinations, such as Fe, Co, FeCo, etc.; and Y includes Platinum (Pt), Rhodium (Rh), Palladium (Pd), Zr, and/or their combinations with/without other doping elements), or Iron-Nitride (Fe—N). The second magnetic material may be any of the above-mentioned magnetic materials, where the second magnetic material is different from the first magnetic material and the second magnetic material has at least one magnetic property that is optimized for a specific application relative to the first magnetic material. Moreover, the second magnets at opposite ends of the first magnet may have different magnetic materials based on the application in which the hybrid permanent magnet is utilized. For example, the hybrid permanent magnet may include a first magnet having a first magnetic material, a second magnet having a second magnetic material assembled on the north pole surface of the first magnet, and a third magnet having a third magnetic material assembled on the south pole surface of the first magnet.

In another embodiment, an electromagnetic induction device comprises a rotor including an electromagnet and a stator surrounding the rotor and including a permanent magnet. The permanent magnet comprises a first magnet having a first magnetic material and a second magnet having a second magnetic material, where the second magnet is assembled on a north pole surface or a south pole surface of the first magnet. The magnetic field of the stator interacts with the rotor causing the rotor to generate motion or electric current.

In various embodiments, the second magnet includes a north surface second magnet and a south surface second magnet, the north surface second magnet assembled on the north pole surface of the first magnet and the south surface second magnet assembled on the south pole surface of the first magnet. Additionally, the first magnet in the permanent magnet may be a rectangular prism or cylindrical shaped and the second magnet(s) may be assembled on one end or two opposite ends of the rectangular prism or cylindrical shaped first magnet perpendicular to a polar axis of the first magnet. Moreover, the length of each of the second magnets may be $\frac{1}{20}$ the length of the permanent magnet, the width of each of the second magnets may be equal to the width of the first magnet, and the height of each of the second magnets may be equal to the height of the first magnet. Furthermore, the first magnetic material may be a ferrite (such as Ba—Fe—O, Ba—Ni—Fe—O, Ba—Sr—Ni—Fe—O, etc.), alnico (such as Al—Ni—Co, Al—Ni—Co—Fe, Al—Ni—Co—Fe—Cu, etc.), rare earth-transition metal-based permanent magnetic materials X-Y or X-Y-Z (where X includes rare-earth elements and their combinations, such as Nd, Sm, Gd, NdDy, NdDyTb, NdDyTbGd, etc.; Y includes transition metal elements and/or their combinations, such as Fe, Co, Mn, Ni, FeCo, FeCoNi, FeCoNiMn, etc.; and Z includes non-metal elements and/or other doping elements and their combinations, such as B, Si, C, N, Cu, Ag, Zr, etc.), Mn-based permanent magnetic materials X-Y or X-Y-Z (where X includes Mn, Fe, MnFe, etc.; and Y includes Bi, Al, Ga, and/or other doping elements such as Pr, as well as the combination of these elements), transition metal-platinum-based magnetic material X-Y (where X includes transition metal elements and/or their combinations, such as Fe, Co, FeCo, etc.; and Y includes Pt, Rh, Pd, Zr, and/or their combinations with/without other doping elements), or Fe—N. The second magnetic material may be any of the above-mentioned magnetic materials, where the second magnetic material is different from the first magnetic material and the second magnetic material has at least one magnetic property that is optimized for a specific application relative to the first magnetic material. The second magnets at opposite ends of the first magnet may have different magnetic materials based on the application in which the hybrid permanent magnet is utilized. In other embodiments, the second magnets include the same magnetic material.

BRIEF DESCRIPTION OF THE DRAWINGS

The following detailed description will be more easily and better understood when considered in conjunction with the following figures, in which like reference numbers are employed to designate like structures. It should be understood that, with the exception of magnified images, the drawings are not to scale, as scaled drawings would not facilitate an understanding of the depicted structures.

DETAILED DESCRIPTION

Figure 1A:
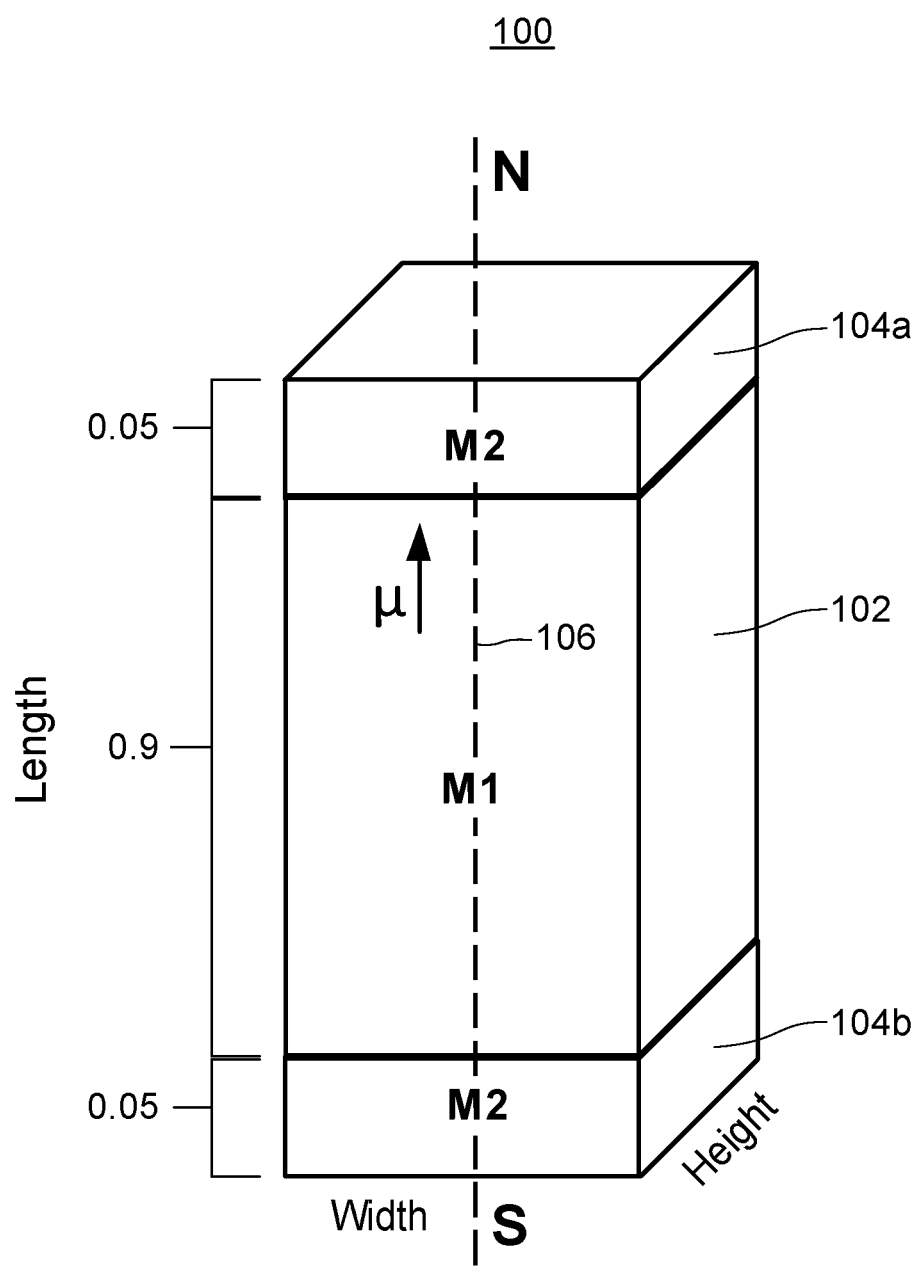
FIG. 1A illustrates an embodiment of an example structure of a hybrid permanent magnet.

A hybrid permanent magnet in accordance with the present description includes a first magnet (M1) having a first magnetic material and two or more second magnets (M2) having a second magnetic material deposited, assembled, or mounted at opposite ends of the first magnet. The second magnets (M2) have magnetic properties optimized for a specific application relative to the first magnet (M1). Accordingly, the second magnets (M2) act as performance boosting magnets to the first magnet (M1) that may use an industry standard magnetic material or a magnetic material of any quality that is inferior to the quality of the M2 magnetic materials. In some embodiments, the M2 magnets have a high magnetic anisotropy ($K_u$) which facilitates magnetic flux concentration away from the hybrid permanent magnet in the direction of the hybrid permanent magnet's magnetic moment.

Additionally, the second magnets (M2) are much smaller than the first magnet (M1) (e.g., the length of each of the second magnets (M2) is $\frac{1}{20}$ the length of the hybrid permanent magnet). In this manner, the hybrid permanent magnet has superior magnetic properties to a permanent magnet made using solely the M1 magnetic material. While the M2 magnetic materials are typically more expensive than the M1 magnetic materials, the small ratio of M2 magnetic material in the hybrid permanent magnet reduces cost compared to a permanent magnet made using solely the M2 magnetic material.

Moreover, the M2 magnetic material may be selected to optimize one or several magnetic properties (e.g., saturation magnetization ($M_S$), magnetic anisotropy ($K_u$), coefficient of temperature (CT) of magnetization, CT of Coercivity, Curie temperature ($T_C$), remanent magnetization ($M_r$), Coercivity ($H_C$), etc.) based on the application. More specifically, an M2 magnetic material may be selected that has a higher saturation magnetization ($M_S$) than the M1 magnet, a higher magnetic anisotropy ($K_u$) than the M1 magnet, a higher or less negative CT of magnetization than the M1 magnet, etc., or any combination of these. For example, an $SmCO_5$ alloy may be used in an M2 magnet. The $SmCO_5$ alloy has a higher magnetic anisotropy ($K_u$), a less negative CT of magnetization, and a higher Curie temperature ($T_C$) compared to an industry standard magnetic material, $Nd_2Fe_{14}B$, used in an M1 magnet. The magnetic anisotropy ($K_u$) for the $SmCO_5$ alloy is 17.2 $MJ/m^3$ compared to a magnetic anisotropy ($K_u$) of 4.9 $MJ/m^3$ for the $Nd_2Fe_{14}B$ magnet. The CT of magnetization for the $SmCO_5$ alloy is –0.03%/° C. compared to –0.12%/° C. for the $Nd_2Fe_{14}B$ magnet and the Curie temperature ($T_C$) for the $SmCO_5$ alloy is 747° C. compared to a Curie temperature ($T_C$) of 315° C. for the $Nd_2Fe_{14}B$. In another example, when saturation magnetization ($M_S$) is optimized an Fe-based permanent magnet may be selected for the M2 magnet, such as Alnico 5 (Aluminum-Nickle-Cobalt 5, $M_s$=1.12 T), FePt ($M_s$=1.43 T), and $Nd_2Fe_{14}B$ ($M_s$=1.61 T). The saturation magnetization values for these materials are the highest amongst the permanent magnetic materials. In yet another example, to optimize coefficient of temperature (CT) for high temperature applications, MnAl and MnBi may be selected for the M2 magnet. Both MnAl and MnBi have a positive CT of Coercivity indicating that the Coercivity for these materials increases at higher temperatures. For example, $Mn_{50}Bi_{50}$ has a Coercivity ($H_C$) of 12.9 kOe at room temperature and a Coercivity ($H_C$) of 28.5 kOe at 177° C.

The coupling strength between the M1 and M2 magnets may also be determined based on the application. For example, the coupling strength may be as tight as exchange coupling or as loose as magnetostatic coupling. The M1 and M2 magnets may be in direct contact with each other or a non-magnetic layer may be placed in between the M1 and M2 magnets. When the non-magnetic layer is placed in between the M1 and M2 magnets, the thickness of the non-magnetic layer may be below the effective interaction distance between the M1 and M2 magnets. Furthermore, the hybrid permanent magnet may be included in an electromagnetic induction device such as a motor or generator and the increased magnetic performance may lead to increased efficiencies in the electromagnetic induction device.

FIG. 1A illustrates one embodiment of a hybrid permanent magnet 100. The hybrid permanent magnet 100 includes a base magnet (M1) 102 having a first magnetic material and two performance boosting magnets (M2) 104a-b each having a second magnetic material. The M2 magnets may be placed on the surfaces of the M1 magnet perpendicular to the direction of the M1 magnet's magnetic moment (µ). As used herein, an axis in the direction of a magnet's magnetic moment may be referred to as the polar axis 106 for the magnet which is the axis that intersects with the magnet's north and south poles. For example, the M1 magnet 102 may have a north pole at the top of the M1 magnet 102 or on one side of the polar axis 106 and a south pole at the bottom of the M1 magnet 102 or on the other side of the polar axis 106 or vice versa. The M2 magnets 104a-b may be placed on surfaces perpendicular to the polar axis 106 of the M1 magnet 102. For example, one M2 magnet 104a may be placed on the north pole surface of the M1 magnet 102 and the other M2 magnet 104b may be placed on the south pole surface of the M1 magnet 102.

The M2 magnets 104a-b have magnetic properties optimized for a specific application relative to the M1 magnet 102, such as increased saturation magnetization ($M_S$), magnetic anisotropy ($K_u$), coefficient of temperature (CT) of magnetization, CT of Coercivity, Curie temperature ($T_C$), remanent magnetization ($M_r$), Coercivity ($H_C$), etc. For example, the M1 magnet 102 may include an industry standard magnetic material, such as low grade: ferrite (e.g., grades 8-25), Aluminum-Nickel-Cobalt (Alnico) (e.g., grades 2-5), SmCo (e.g., grades 16-20), or NdFeB (e.g., grades 27-30). The M2 magnets 104a-b may have magnetic properties optimized for a specific application relative to the M1 magnet 102 and may include high grade: ferrite (e.g., grades 34-40), SmCo (e.g., grades 28-32), NdFeB (e.g., grades 48-52), or rare-earth element doped NdFeB (e.g., NdDyFeB or NdHoFeB). The M2 magnets 104a-b may also include MnBi, MnAl, MnPrBi, FePt, or CoPt.

In some embodiments, the M2 magnets be layered such that there is an M1 magnet placed in between M2 magnets placed in between M3 magnets, etc. where the magnets are placed in increasing order of strength. For example, an M1 magnet with low magnetic anisotropy ($K_u$) is placed in between M2 magnets having medium magnetic anisotropy ($K_u$) and the M2 magnets are placed in between M3 magnets having high magnetic anisotropy ($K_u$). Any suitable number of layers may be utilized. Moreover, any suitable number of magnetic materials (M2, M3, etc.) may be included on either of the north and south pole surfaces of the M1 magnet. For example, the M1 magnet may have layered M2, M3, and M4 magnets on the north pole surface of the M1 magnet and a single M2 magnet on the south pole surface of the M1 magnet.

Figure 1B:
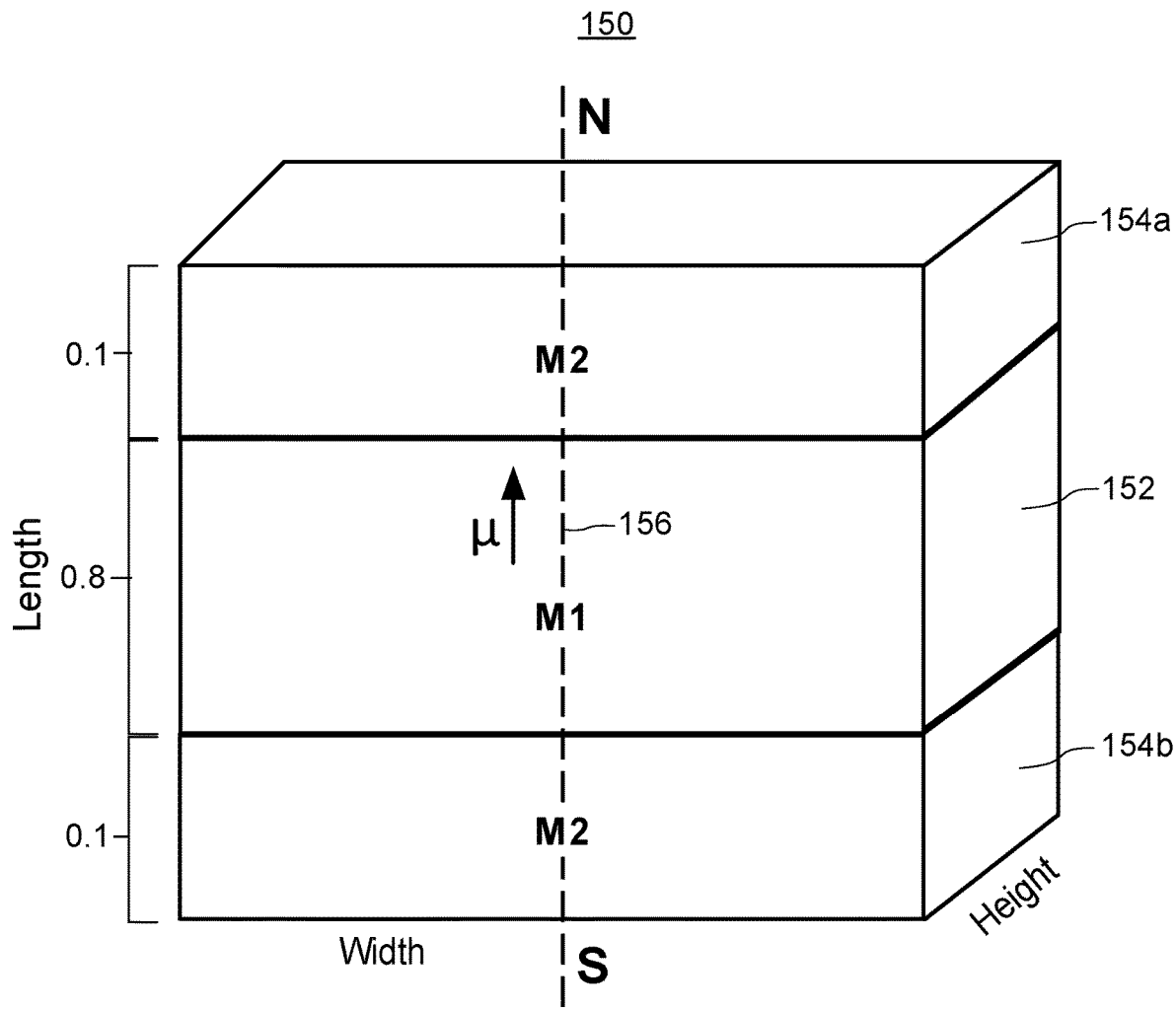
FIG. 1B illustrates another embodiment of an example structure of a hybrid permanent magnet.
Figure 1C:
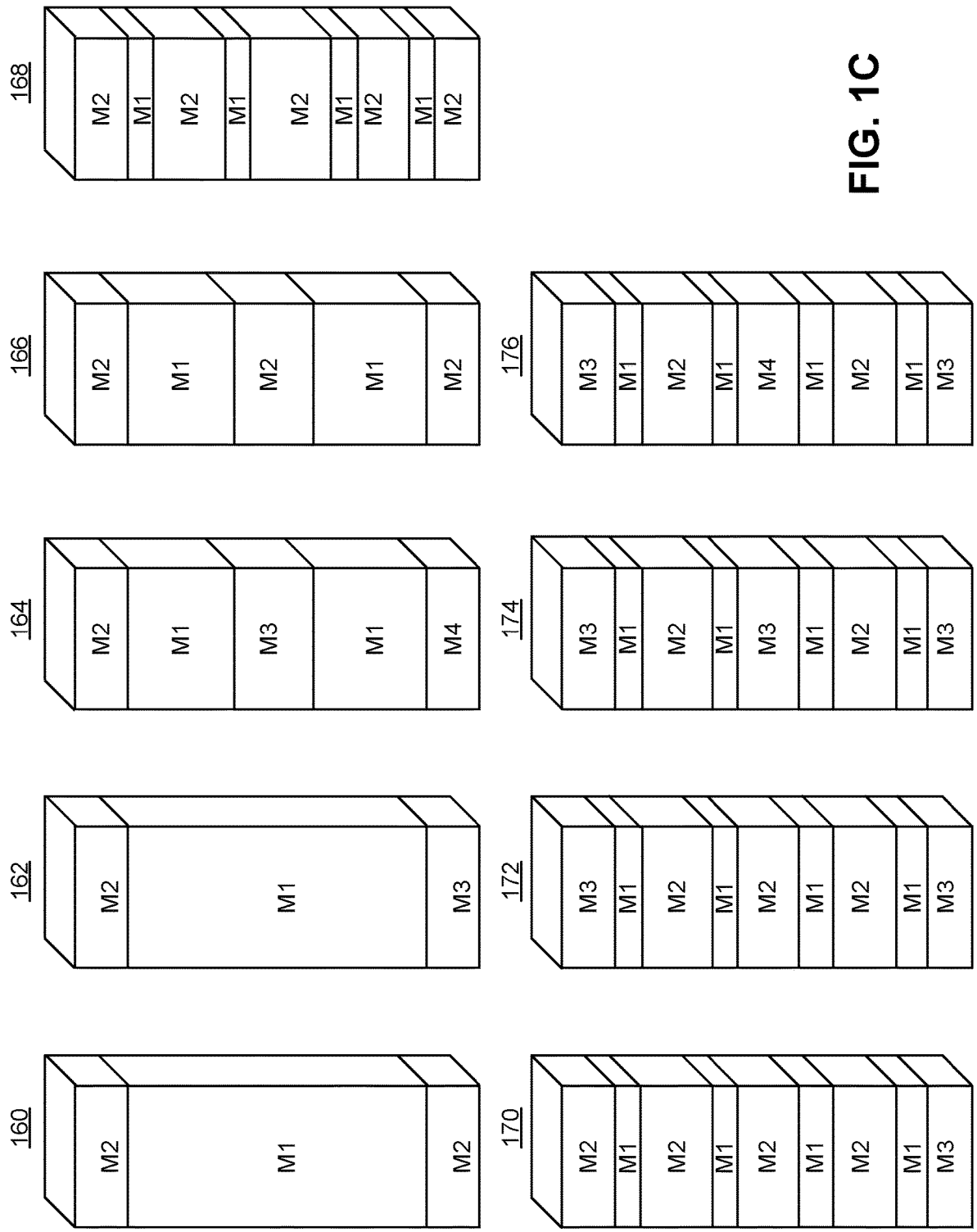
FIG. 1C illustrates several example structures of hybrid permanent magnets having two or more magnetic materials.

FIG. 1C provides several example hybrid permanent magnet configurations 160-176 having layers of magnetic materials (M1, M2, M3, M4, etc.). While each of the example hybrid permanent magnets 160-176 shown in FIG. 10 are depicted as a rectangular prism, this is for ease of illustration only. The hybrid permanent magnets 160-176 may be any suitable shape. In any event, the first hybrid permanent magnet 160 includes a configuration similar to the configuration of the hybrid permanent magnet 100 as shown in FIG. 1A, where two M2 magnets are assembled on the north and south pole surfaces of an M1 magnet. In the second hybrid permanent magnet 162, different magnetic materials (M2 and M3) are assembled on the respective north and south pole surfaces of the M1 magnet.

The next seven hybrid permanent magnets 164-176 include examples of layered hybrid permanent magnets, where each hybrid permanent magnet 164-176 includes several layers of different magnetic materials. In each of the layered hybrid permanent magnets 164-176, at least one magnetic material (e.g., M1, M2, M3, M4) is non-contiguous within the hybrid permanent magnet 164-176 and at least two magnetic materials have a different magnetic material on their respective north and south pole surfaces. More specifically, the third hybrid permanent magnet 164 includes an M2 magnet on the north pole surface of an M1 magnet and an M3 magnet on the south pole surface of the M1 magnet, similar to the second hybrid permanent magnet 162. However, unlike the second hybrid permanent magnet 162, the third hybrid permanent magnet 164 includes a second M1 magnet on the south pole surface of the M3 magnet and an M4 magnet on the south pole surface of the second M1 magnet. The M1 magnet is non-contiguous within the third hybrid permanent magnet 164 as the M3 magnet is placed between two M1 magnets. Additionally, both the M1 magnetic material and the M3 magnetic material have a different magnetic material on their respective north and south pole surfaces. The M1 magnetic material has M2, M3, and M4 magnetic materials on its north and south pole surfaces and the M3 magnetic material has the M1 magnetic material on its north and south pole surfaces.

The fourth hybrid permanent magnet 166 includes two M1 magnets placed between three M2 magnets and the fifth hybrid permanent magnet 168 includes four M1 magnets placed between five M2 magnets. Furthermore, the sixth hybrid permanent magnet 170 is similar to the fifth hybrid permanent magnet 168, but has an M3 magnet placed on the south pole surface of the M1 magnet closest to the south pole of the sixth hybrid permanent magnet 170. The seventh hybrid permanent magnet 172 is similar to the sixth hybrid permanent magnet 170, but has a second M3 magnet placed on the north pole surface of the M1 magnet closest to the north pole of the seventh hybrid permanent magnet 170. The eighth hybrid permanent magnet 174 is similar to the seventh hybrid permanent magnet 172, but has a third M3 magnet placed near the center of the eighth hybrid permanent magnet 174 between the north and south poles. Moreover, the ninth hybrid permanent magnet 176 is similar to the eighth hybrid permanent magnet 174, but has an M4 magnet placed near the center of the ninth hybrid permanent magnet 176 between the north and south poles. While these are merely a few example hybrid permanent magnet configurations, the hybrid permanent magnet may include any suitable configuration and/or any suitable number of magnetic materials.

Turning back to FIG. 1A, as used herein, the dimension parallel to the polar axis 106 for the hybrid permanent magnet 100 may be referred to as the hybrid permanent magnet's length. The dimensions perpendicular to the polar axis 106 for the hybrid permanent magnet 100 may be referred to as the hybrid permanent magnet's 100 width and height, respectively. In the example hybrid permanent magnet 100, the length (or dimension parallel to the polar axis 106) of each M2 magnet 104a-b is 1/20 the length of the hybrid permanent magnet 100 (e.g., 0.05) and the length of the M1 magnet 102 is 9/10 the length of the hybrid permanent magnet 100 (e.g., 0.9). Additionally, the width and height (or dimensions perpendicular to the polar axis 106) of each M2 magnet 104a-b may be equal or approximately equal (e.g., within a threshold percentage such as ±5%) to the width and height of the M1 magnet 102.

In other embodiments, the ratio of the lengths or volumes of the M1 and M2 magnets 102, 104a-b may be any suitable ratio such that the length or volume of the M1 magnet 102 is greater than or equal to the combined length or volume of the M2 magnets 104a-b (e.g., 9:1, 4:1, 3:2, 1:1, etc.). Also in some embodiments, each M2 magnet 104a-b has an equal or approximately equal length, width and/or height to the other M2 magnet 104a-b.

While the hybrid permanent magnet 100 is depicted in FIG. 1A as a rectangular prism, the hybrid permanent magnet 100 may be cylindrical, spherical, hemispherical, horseshoe shaped, disk shaped, ring shaped, a parallelepiped, a cube, or shaped in any other suitable manner.

The hybrid permanent magnet 100 may be assembled by placing the M2 magnets 104a-b on opposite ends of the M1 magnet 102 in any suitable manner. In some embodiments, the hybrid permanent magnet 100 may be assembled mechanically via screws, bolts, welds, or press fits. The hybrid permanent magnet 100 may also be assembled via integration such as injection or compression molding. More specifically, M1 magnet powder may be melted together and injected onto the M2 magnets 104a-b or the M2 magnets 104a-b may be brought into atomic contact with the M1 magnet 102 via force and/or heat (atomic layer deposition). In other embodiments, the hybrid permanent magnet 100 may be assembled via high pressure thermal compression or high pressure annealing. The M1 magnet powders and M2 magnet powders may be consolidated under high pressure compression at room temperature or at high temperatures. In yet other embodiments, the hybrid permanent magnet 100 may be assembled using ultrasonic welding by for example, fusing together the M1 and M2 magnets 102, 104a-b using high frequency ultrasonic pulses. In yet other embodiments, the hybrid permanent magnet 100 may be assembled using an adhesive such as glue or direct bonding. Still further, the hybrid permanent magnet 100 may be assembled by coating, plating, or 3D printing the M2 magnets 104a-b onto the surface of the M1 magnet 102. In some embodiments, the coupling strength between the M1 and M2 magnets 102, 104a-b is determined based on the application. For example, the coupling strength may be as tight as exchange coupling or as loose as magnetostatic coupling.

FIG. 1B illustrates another embodiment of a hybrid permanent magnet 150. The hybrid permanent magnet 150 as shown in FIG. 1B is similar to the hybrid permanent magnet 100 as shown in FIG. 1A having an M1 magnet 152 and two M2 magnets 154a-b on surfaces perpendicular to the polar axis 156 of the M1 magnet 152 or on the north and south pole surfaces of the M1 magnet 152, respectively. While the width of the hybrid permanent magnet 150 in this example embodiment is greater than the length, the length is identified as the dimension parallel to the polar axis 156 of the M1 magnet 152. Additionally, in this example embodiment, the length of each M2 magnet 154a-b is 1/10 the length of the hybrid permanent magnet 150 (e.g., 0.1) and the length of the M1 magnet 152 is 8/10 the length of the hybrid permanent magnet 150 (e.g., 0.8).

Figures 2A, 2B:
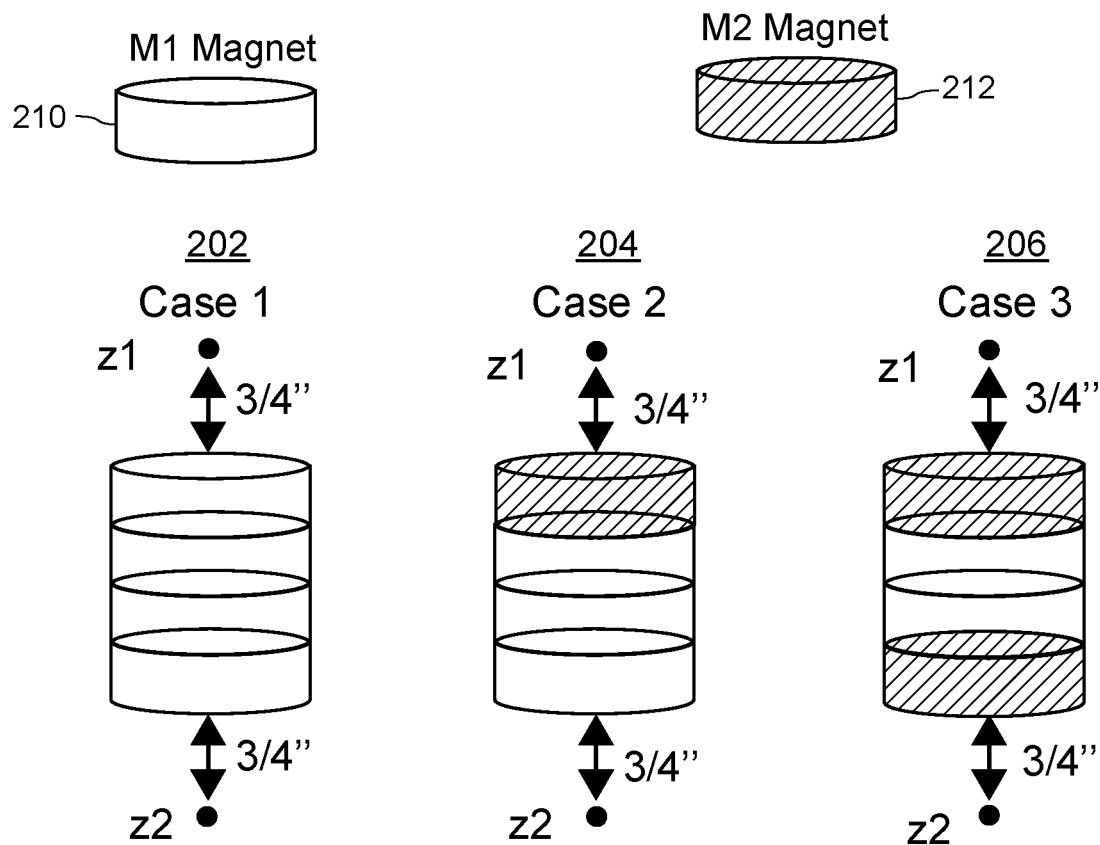
FIG. 2A illustrates example structures of permanent magnets having four magnet configurations, including a permanent magnet having only first magnets, a permanent magnet having three first magnets and a second magnet, and a permanent magnet having two first magnets in between two second magnets similar to the hybrid permanent magnet as depicted in FIG. 1A.
FIG. 2B is a table indicating the magnetic strengths of the example permanent magnet structures depicted in FIG. 2A.

FIG. 2A illustrates three example permanent magnet structures 202-206, each including four cylindrical magnetic components placed on surfaces perpendicular to their respective polar axes. M1 magnets 210 are depicted with a disk having no shading and M2 magnets 212 are depicted with a disk having a shading. In the example permanent magnet structures 202-206, the M2 magnets 212 have higher magnetic anisotropy ($K_u$) than the M1 magnets 210. In the first example permanent magnet structure 202 (Case 1), all four magnetic components are M1 magnets 210. In the second example permanent magnet structure 204 (Case 2), one M2 magnet 212 is placed on the north pole surface of three M1 magnets 210. In the third example permanent magnet structure 206 (Case 3), one M2 magnet 212 is placed on the north pole surface of two M1 magnets 210 and one M2 magnet 212 is placed on the south pole surface of the two M1 magnets 210. To illustrate the effectiveness of the hybrid permanent magnet 206 (Case 3), the magnetic flux densities are measured at a distance z1 (¾") away from the north pole surface of each of the permanent magnets 202-206 and a distance z2 (¾") away from the south pole surface of each of the permanent magnets 202-206 in the direction of the respective polar axes of the permanent magnets 202-206.

As shown in the example table 250 in FIG. 2B, the magnetic flux density at a distance z1 away from the north pole surface of the permanent magnet structure 202 (Case 1) is 143 Gauss (G). The magnetic flux density at a distance z2 away from the south pole surface of the permanent magnet structure 202 (Case 1) is 147 G. For the second permanent magnet structure 204 (Case 2), the magnetic flux density at a distance z1 away from the north pole surface of the second permanent magnet structure 204 is 158 G and the magnetic flux density at a distance z2 away from the south pole surface of the second permanent magnet structure 204 is 152 G. The magnetic flux densities at distances z1, z2 away from the north and south pole surfaces of the hybrid permanent magnet structure 206 (Case 3) are highest at 166 G and 167 G, respectively. Accordingly, the magnetic flux densities at distances z1, z2 away from the north and south pole surfaces of the hybrid permanent magnet structure 206 are about 15% higher on average than the magnetic flux densities at distances z1, z2 away from the north and south pole surfaces of the permanent magnet structure 202. Compared to the second permanent magnet structure 204, the magnetic flux densities at distances z1, z2 away from the north and south pole surfaces of the hybrid permanent magnet structure 206 are about 7.5% higher on average. While an M2 magnet 212 is not placed on the south pole surface of the M1 magnets 210 in the second permanent magnet structure 204, the magnetic flux density at a distance z2 away from the south pole surface of the second permanent magnet structure 204 is higher (152 G) than the magnetic flux density at a distance z2 away from the south pole surface of the permanent magnet structure 202 (147 G), presumably due to the M2 magnet 212 placed away from the north pole surface of the three M1 magnets 210.

Figure 3:
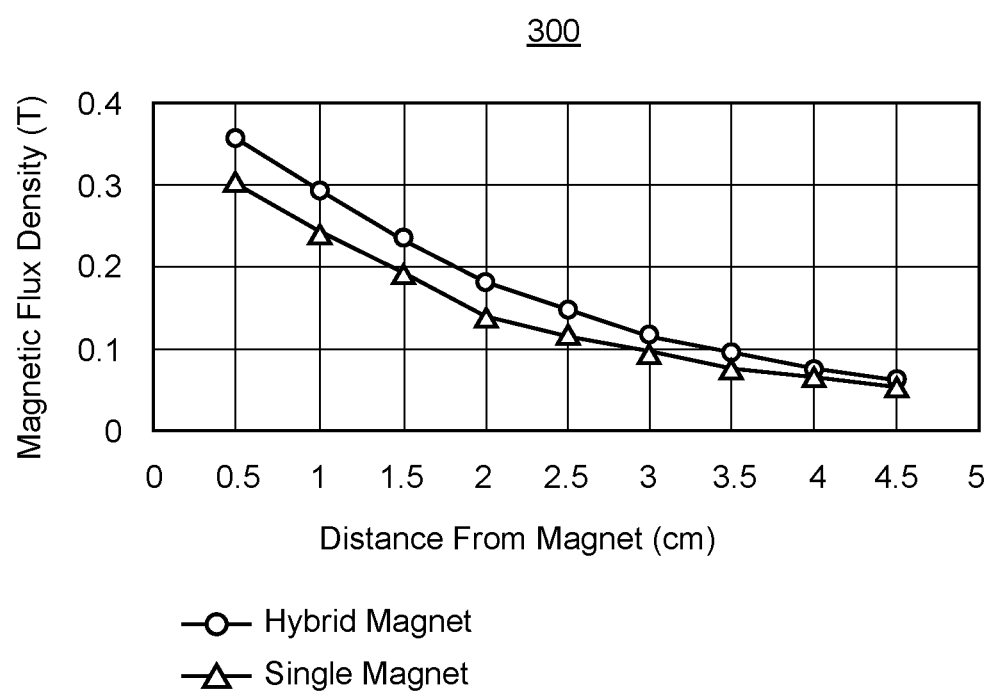
FIG. 3 is a graph depicting the relationship between magnetic flux density and distance from the magnet for a permanent magnet with a single magnetic material and for the hybrid permanent magnet as depicted in FIG. 1A.

FIG. 3 illustrates another example of the improved magnetic field strength of a hybrid permanent magnet having M2 magnets assembled on the north and south pole surfaces of an M1 magnet, such as the hybrid permanent magnet 100 as shown in FIG. 1A, compared to a permanent magnet that has the same length as the hybrid permanent magnet but uses a single magnetic material (a "single permanent magnet"), such as the M1 magnetic material in FIG. 1A. More specifically, in FIG. 3 the lengths of the M1 and M2 magnets in the hybrid permanent magnet may be 4.5 cm and 0.25 cm, respectively, for a total length of 5 cm. The heights and widths of the M1 and M2 magnets in the hybrid permanent magnet may each be 5 cm. In the single permanent magnet, the length of the M1 magnet may be 5 cm and the height and width of the M1 magnet may each be 5 cm.

In this example, the M2 magnets of the hybrid permanent magnet 100 have higher magnetic anisotropy ($K_u$) than the M1 magnets of the hybrid permanent magnet and the single permanent magnet. More specifically, FIG. 3 illustrates a graph 300 depicting the relationship between magnetic flux density and distance from a surface of the magnet for the hybrid permanent magnet and the single permanent magnet. At a distance of 0.5 centimeters (cm) from the surface of each the magnets in each magnet's easy-axis direction (the direction of the magnetic moment μ), the magnetic flux density for the single permanent magnet is about 0.3 Tesla (T) whereas the magnetic flux density for the hybrid permanent magnet is about 0.35 T. Accordingly, the hybrid permanent magnet has about a 17% increase in magnetic flux density compared to the single permanent magnet at a distance of 0.5 cm from the surface. At a distance of 1 cm from the surface, the magnetic flux density for the single permanent magnet is about 0.25 T while the magnetic flux density for the hybrid permanent magnet is about 0.3 T.

In the example graph 300, the magnetic flux density for the hybrid permanent magnet is steadily above the magnetic flux density for the single permanent magnet from 0.5-2 cm away from the respective surfaces. Then, at about 2.5 cm away from the respective surfaces, the difference between the magnetic flux densities decreases until 4.5 cm away from the respective surfaces, where the magnetic flux densities for the hybrid permanent magnet and the single permanent magnet are about the same. However, this is merely one example of the difference between the magnetic flux densities for the hybrid permanent magnet and a single permanent magnet as a function of the distance from the respective surfaces. In this example, the M2 magnetic material may have been selected such that the magnetic flux density improves the most at short distances (e.g., less than 2.5 cm) away from the surface of the hybrid permanent magnet.

For applications that require magnetic flux density to improve the most at farther distances (e.g., greater than a threshold distance) from the surface of the hybrid permanent magnet, the magnetic material for the M2 portions may be selected having higher magnetic anisotropy ($K_u$) (e.g., high grade NdFeB) than the M1 portions. Additionally or alternatively, the length of the M2 portions may be increased relative to the length of the M2 portions for an application that does not require magnetic flux density to improve the most at farther distances from the surface of the hybrid permanent magnet. Moreover, a combination of the length of the M2 portions and the magnetic material of the M2 portions may be selected to optimize magnetic flux density at farther distances from the surface of the hybrid permanent magnet.

Figure 4:
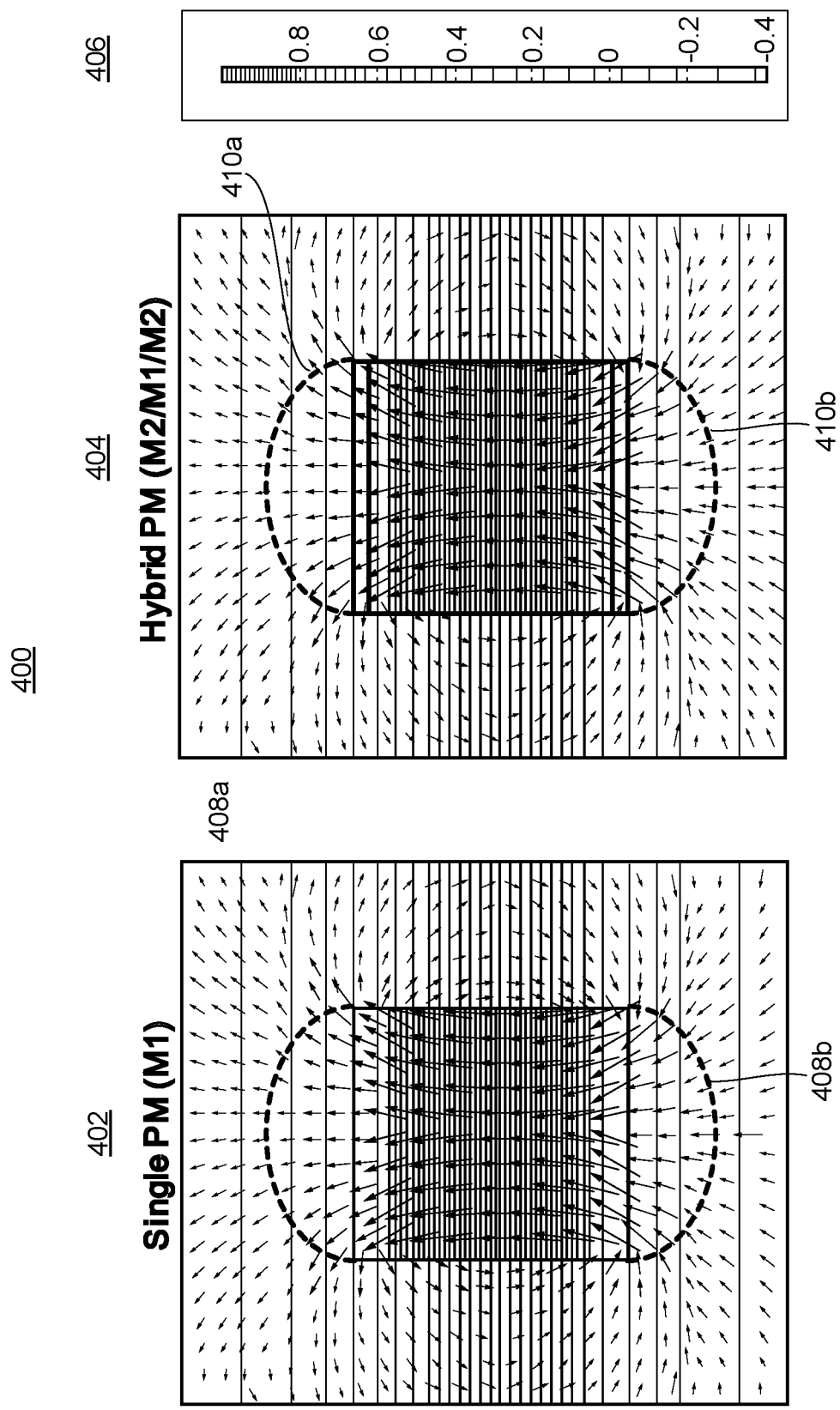
FIG. 4 is a heat map indicating magnet flux densities at or around the permanent magnet with a single magnetic material and the hybrid permanent magnet as depicted in FIG. 1A.

FIG. 4 illustrates an example heat map 400 indicating the magnetic flux density at or around the surfaces of a single permanent magnet M1 402 and a hybrid permanent magnet M2/M1/M2 404, similar to the hybrid permanent magnet 100 as shown in FIG. 1A. The arrows in the heat map 400 represent magnetic flux at different points within or around the permanent magnets. More specifically, the direction of an arrow indicates the direction of the magnetic flux at the point represented by the arrow and the length of an arrow is proportional to the magnitude of the magnetic flux at the point represented by the arrow.

As shown in the legend 406, greater horizontal line densities indicate higher levels of magnetic flux density and lower horizontal line densities indicate lower levels of magnetic flux density. The hybrid permanent magnet 404 may have M2 magnets with higher magnetic anisotropy than the magnetic anisotropy for the M1 magnets in the single and hybrid permanent magnets 402, 404. The high $K_u$ M2 magnets in the hybrid permanent magnet 404 facilitate magnetic flux concentration away from the north and south pole surfaces of the hybrid permanent magnet 404. As a result, the magnetic flux density directly beyond the north and south pole surfaces of the hybrid permanent magnet 404 in the direction of the hybrid permanent magnet's polar axis (e.g., in regions 410a, 410b) is higher than the magnetic flux density in similar regions (e.g., regions 408a, 408b) relative to the single permanent magnet 402.

In addition to selecting M2 magnets with high magnetic anisotropy ($K_u$), M2 magnets may be selected that have other magnetic properties optimized for a specific application relative to the M1 magnet to boost the performance of the hybrid permanent magnet 100. For example, the magnetic materials for the M2 magnets may be optimized to have higher saturation magnetization ($M_S$) than the M1 magnet and/or a saturation magnetization ($M_S$) above a threshold. The saturation magnetization ($M_S$) of a material is the maximum magnetization that the material can achieve. At saturation, all magnetic moments of the magnetic material are aligned parallel to the external magnetic field. Additionally, at saturation any further increase in the strength of the external magnetic field will not increase the magnetization of the material. In another example, the magnetic materials for the M2 magnets may be optimized to have a better high temperature performance. More specifically, M2 magnetic materials may be selected that have a Curie temperature ($T_C$) far above the working temperature of the hybrid permanent magnet (e.g., above a threshold temperature) and/or a coefficient of temperature (CT) (of magnetization and/or of Coercivity) that is a small negative number (e.g., less than a threshold negative CT) or a small or large positive number so that at the working temperature of the hybrid permanent magnet, the magnetization or Coercivity of the hybrid permanent magnet maintain significant values (e.g., above respective threshold magnetization and Coercivity). A Curie temperature is the temperature at which a magnetic material begins to lose its magnetization. A CT is indicative of the rate at which a permanent magnet loses its magnetic strength as a function of temperature. For example, SmCo magnets may have a higher $T_C$ than NdFeB magnets. In another example, NdFeB magnets may have a higher CT than ferrite magnets. While the CTs for ferrite magnets and NdFeB magnets may both be negative, a higher CT for NdFeB may indicate that the CT for NdFeB is less negative than the CT for ferrite.

The benefit from a higher Tc or a small negative or even a positive CT for an M2 magnet is that at a particular temperature the M2 magnet maintains a strong magnetization or magnetic flux density while the M1 magnet's magnetization becomes negligible. If the M1 magnet is used alone (e.g., in a single permanent magnet), the single permanent magnet loses its function as a magnetic field source when the temperature approaches the Tc or when the single permanent magnet reaches a temperature where its magnetization is close to zero. By contrast, in a hybrid permanent magnet having an M2 magnet with a higher CT and/or a higher $T_C$ than the M1 magnet, the M2 magnet may continue to provide a magnetic field for the hybrid permanent magnet at a temperature in which the M1 magnet loses its magnetization. In addition, the M2 magnet may also provide a magnetic field to the M1 magnet and magnetize the M1 magnet at the temperature in which the M1 magnet, when present alone, loses its magnetization. The effect of the M2 magnet magnetizing the M1 magnet at elevated temperatures further improves the magnetic flux density of a hybrid permanent magnet when compared to a permanent magnet where at elevated temperatures the M2 magnet maintains a strong magnetization but cannot magnetize the M1 magnet and the M1 magnet completely loses its magnetization.

Figure 5:
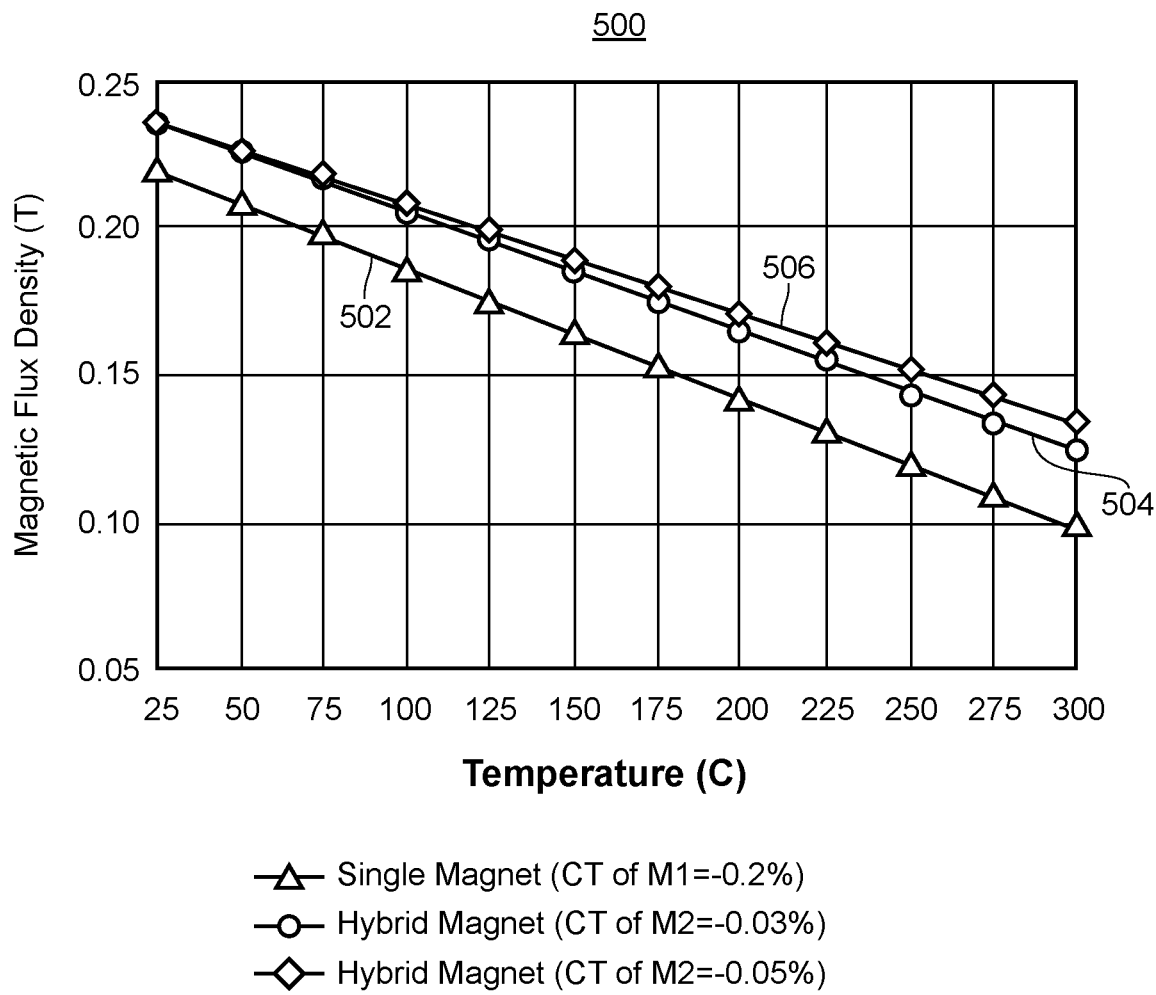
FIG. 5 is a graph depicting the relationship between magnetic flux density and temperature for the permanent magnet with a single magnetic material and for hybrid permanent magnets.

FIG. 5 illustrates an example of the magnetic properties of hybrid permanent magnets having M2 magnets selected to optimize CT compared to the magnetic properties of a single permanent magnet. In this example, the geometry and structure of the hybrid permanent magnets is similar to the hybrid permanent magnet shown in FIG. 1A having M2 magnets on the north and south pole surfaces of an M1 magnet, where the magnetic material for the M2 magnets is different from the magnetic material for the M1 magnet. The single permanent magnet in this example may have the same dimensions as the hybrid permanent magnet but includes an M1 magnet without M2 magnets.

More specifically, FIG. 5 illustrates a graph 500 depicting the relationship between magnetic flux density and temperature at 1.5 cm away from the north and south pole surfaces of a single permanent magnet 502 having a CT of magnetization of −0.2%/° C., a first hybrid permanent magnet 504 having a CT of magnetization of −0.2%/° C. for the M1 magnet and a CT of magnetization of −0.03%/° C. for the M2 magnet, and a second hybrid permanent magnet 506 having a CT of magnetization of −0.2%/° C. for the M1 magnet and a positive CT of magnetization of 0.05%/° C. for the M2 magnet in the direction of the respective polar axes. In the example graph 500, the magnetic flux density of the hybrid permanent magnets 504, 506 (about 0.24 T) is higher than the magnetic flux density of the single permanent magnet 502 (about 0.22 T) at an initial temperature of 25° C. This is because the M2 magnets in the hybrid permanent magnets 504, 506 have a higher magnetic anisotropy than the M1 magnets in the single and hybrid permanent magnets 502-506, thereby increasing the magnetic flux density directly beyond the north and south pole surfaces of the hybrid permanent magnets 504,506 in the directions of the hybrid permanent magnets' polar axes.

While the magnetic flux densities for each of the single and hybrid permanent magnets 502-506 appear to decrease linearly as a function of temperature, the magnetic flux density for the single permanent magnet 502 appears to decline at the highest rate (from about 0.22 T to 0.10 T from 25° C. to 300° C.), followed by the first hybrid permanent magnet 504 (from about 0.24 T to 0.13 T from 25° C. to 300° C.), followed by the second hybrid permanent magnet 506 (from about 0.24 T to 0.14 T from 25° C. to 300° C.). Accordingly, the second hybrid permanent magnet 506 is least effected by the temperature.

In any event, different M2 magnetic materials may be selected to optimize various magnetic properties depending on the application. For example, hybrid permanent magnets used in turbines may be subject to different conditions (e.g., different working temperature ranges) than hybrid permanent magnets used in electric vehicle motors. Accordingly, the M2 magnetic material selected for the hybrid permanent magnet used in a turbine may be selected that optimizes Curie temperature ($T_C$), whereas the M2 magnetic material selected for the hybrid permanent magnet used in an electric vehicle motor may be selected that optimizes Coercivity ($H_C$). On the other hand, the standards for the M1 magnet in the hybrid permanent magnet 100 may be relaxed, such that the $K_u$, $T_C$, CT, and/or other magnetic properties are below threshold or required values to reduce the cost of the hybrid permanent magnet 100.

As mentioned above, the hybrid permanent magnet 100 may be used in an electromagnetic induction device, such as a motor or generator. More specifically, the hybrid permanent magnet 100 may be used in the stator of the electromagnetic induction device to increase the efficiency of the device. For example, the torque (τ) in a motor may be determined according to the equation $$\tau = BI\ell w \tag{Eq. 1}$$

where B is the magnetic flux density, I is the current in a current carrying loop, $\ell$ is the length of the current carrying loop, and w is the width of the current carrying loop. Accordingly, the torque in a motor is proportional to the magnetic flux density. By increasing the magnetic flux density of the hybrid permanent magnet 100, the motor efficiency increases.

Figure 6:
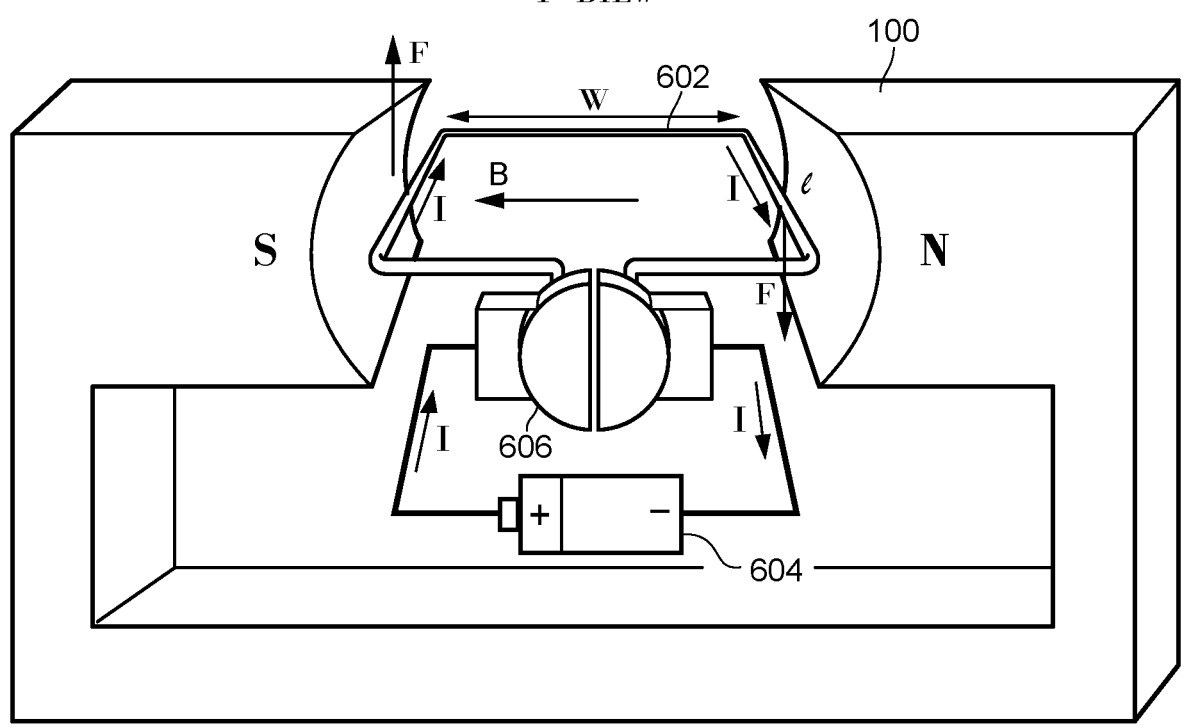
FIG. 6 is a schematic diagram of an electric motor including a stator made using the hybrid permanent magnet as depicted in FIG. 1A.

FIG. 6 illustrates an example electromagnetic induction device 600 having the hybrid permanent magnet 100 as the stator and a rotor 602, where the stator surrounds the rotor 602. In some embodiments, the hybrid permanent magnet 100 in the stator is a horseshoe shaped magnet. The rotor 602 may be a current carrying loop having a length l and a width w and is connected to a power source 604, such as a battery. The rotor 602 may be an electromagnet which produces a magnetic field in response to an electric current. When the electric current dissipates, the electromagnet stops producing the magnetic field. In any event, the current from the power source 604 generates a magnetic field at the rotor 602. The magnetic field at the rotor 602 interacts with the magnetic field from the hybrid permanent magnet 100 in the stator causing the rotor 602 to repel from the stator and consequently rotate about an axis. Once the rotor 602 is in the vertical position, a commutator 606 reverses the polarity of the current, so that the rotor 602 continuously rotates in the same direction. A stronger magnetic field produced by the hybrid permanent magnet 100 increases the torque on rotor 602, thereby increasing the motor efficiency. In some scenarios, the hybrid permanent magnet 100 includes M2 magnets on the north and south pole surfaces of the M1 magnet, where the two M2 magnets have two different magnetic materials. In other scenarios, the two M2 magnets have the same magnetic material to provide uniform magnetic flux distribution.

In some embodiments, the electromagnetic induction device 600 is a motor, such as an induction motor, a permanent magnet direct current (DC) motor, a permanent magnet alternating current (AC) motor, a brushless DC motor, or any other suitable motor. The motor may be used in an electric vehicle, a conveyor belt, consumer electronics such as a power tool, or any other suitable device.

While the example electromagnetic induction device 600 illustrated in FIG. 6 is a motor, this is one example electromagnetic induction device 600 depicted for ease of illustration only. The electromagnetic induction device 600 may be a generator, where the rotor 602 is connected to a pump or shaft to rotate the rotor 602. The motion of the rotor 602 in the magnetic field from the hybrid permanent magnet 100 in the stator generates an electric current. As with the motor, a stronger magnetic field produced by the hybrid permanent magnet 100 increases the current output, thereby increasing the generator efficiency. The generator may be a DC generator, an AC generator, or any other suitable type of generator. Additionally, the generator may be used in power regeneration devices such as a wind turbine, solar power generator, or hydroelectric generator, or any other suitable device. Furthermore, the electromagnetic induction device 600 may be any suitable electromagnetic induction device, such as an RF device, an electronic oscillator, etc.

As will be appreciated, the hybrid permanent magnets in accordance with the described and contemplated embodiments provide numerous advantages over present technology, including: stronger magnetic fields and magnetic properties optimized for a specific application (e.g., saturation magnetization ($M_S$), magnetic anisotropy ($K_u$), c coefficient of temperature (CT) of magnetization, CT of Coercivity, Curie temperature ($T_C$), remanent magnetization ($M_r$), Coercivity ($H_C$), etc.) at a lower cost. As a result, the hybrid permanent magnets described herein have application in a wide variety of applications, including consumer electronics, RF communications, commercial applications, power generation applications, transportation applications, and nearly any application in which motors or generators of any type or more generally permanent magnets are presently employed.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A permanent magnet comprising: a first magnet having a first magnetic material; and a second magnet having a second magnetic material different from the first magnetic material, the second magnet assembled on a north pole surface or a south pole surface of the first magnet; wherein a volume of the second magnet is less than or equal to a volume of the first magnet 2. A permanent magnet according to aspect 1, wherein the second magnet includes a north surface second magnet and a south surface second magnet, the north surface second magnet assembled on the north pole surface of the first magnet and the south surface second magnet assembled on the south pole surface of the first magnet 3. A permanent magnet according to aspect 1 or aspect 2, wherein the first magnet is a rectangular prism or cylindrical and the second magnets are assembled on opposite ends of the rectangular prism or cylindrical first magnet perpendicular to a polar axis of the first magnet.

4. A permanent magnet according to any one of the preceding aspects, wherein a length of each of the second magnets is ½₀ the length of the permanent magnet.

5. A permanent magnet according to any one of the preceding aspects, wherein a width of each of the second magnets is equal to a width of the first magnet and wherein a height of each of the second magnets is equal to a height of the first magnet.

6. A permanent magnet according to any one of the preceding aspects, wherein: the first magnetic material is at least one of: alnico, ferrite, a rare earth-transition metal-based permanent magnetic material, a manganese-based permanent magnetic material, a transition metal-platinum-based magnetic material, or Iron-Nitride (Fe—N); and the second magnetic material is at least one other of: alnico, ferrite, the rare earth-transition metal-based permanent magnetic material, the manganese-based permanent magnetic material, the transition metal-platinum-based magnetic material, or Fe—N.

7. A permanent magnet according to any one of the preceding aspects, wherein the permanent magnet has a higher magnetic flux density than a magnetic flux density of the first magnet.

8. A permanent magnet according to any one of the preceding aspects, wherein at least one of: a saturation magnetization ($M_S$), magnetic anisotropy ($K_u$), coefficient of temperature (CT) of magnetization, CT of Coercivity, Curie temperature ($T_C$), remanent magnetization ($M_r$), or Coercivity ($H_C$) is higher for the second magnetic material than the first magnetic material.

9. A permanent magnet according to any one of the preceding aspects, wherein at least one of: the saturation magnetization ($M_S$), magnetic anisotropy ($K_u$), coefficient of temperature (CT) of magnetization, CT of Coercivity, Curie temperature ($T_C$), remanent magnetization ($M_r$), or Coercivity ($H_C$) is optimized for the second magnetic material based on an application of the permanent magnet.

10. A permanent magnet according to any one of the preceding aspects, wherein the second magnet is mechanically attached to the first magnet or the second magnet is attached to the first magnet via at least one of: injection molding, compression molding, adhesion, high pressure compression, high pressure annealing, or direct bonding.

11. A permanent magnet according to any one of the preceding aspects, wherein an interaction between the first and second magnet is magnetostatic interaction or exchange-coupled interaction.

12. A permanent magnet according to any one of the preceding aspects, wherein the second magnet is coated, plated, or printed onto the first magnet.

13. A permanent magnet according to any one of the preceding aspects, wherein the second magnet is in direct contact with the first magnet.

14. A permanent magnet according to any of the preceding aspects, wherein a non-magnetic layer is assembled in between the first and second magnets, wherein a thickness of the non-magnetic layer is less than an effective interaction distance between the first and second magnets.

15. An electromagnetic induction device comprising: a rotor including an electromagnet; and a stator surrounding the rotor and including a permanent magnet comprising: a first magnet having a first magnetic material; and a second magnet having a second magnetic material, the second magnet assembled on a north pole surface or a south pole surface of the first magnet; wherein a magnetic field of the stator interacts with the rotor causing the rotor to generate motion or electric current.

16. An electromagnetic induction device according to aspect 15, wherein the second magnet includes a north surface second magnet and a south surface second magnet, the north surface second magnet assembled on the north pole surface of the first magnet and the south surface second magnet assembled on the south pole surface of the first magnet.

17. An electromagnetic induction device according to aspect 15 or aspect 16, wherein the first magnet in the permanent magnet is a rectangular prism or cylindrical and the second magnets are assembled on opposite ends of the rectangular prism or cylindrical first magnet perpendicular to a polar axis of the first magnet.

18. An electromagnetic induction device according to any one of the preceding aspects, wherein a length of each of the second magnets is 1/20 a length of the permanent magnet.

19. An electromagnetic induction device according to any one of the preceding aspects, wherein: the first magnetic material is at least one of: alnico, ferrite, a rare earth-transition metal-based permanent magnetic material, a manganese-based permanent magnetic material, a transition metal-platinum-based magnetic material, or Iron-Nitride (Fe—N); and the second magnetic material is at least one other of: alnico, ferrite, the rare earth-transition metal-based permanent magnetic material, the manganese-based permanent magnetic material, the transition metal-platinum-based magnetic material, or Fe—N.

20. An electromagnetic induction device according to any one of the preceding aspects, wherein the stator has a higher magnetic flux density than a magnetic flux density of the first magnet, increasing efficiency of the electromagnetic induction device.

21. An electromagnetic induction device according to any one of the preceding aspects, wherein at least one of: a saturation magnetization ($M_S$), magnetic anisotropy ($K_u$), coefficient of temperature (CT) of magnetization, CT of Coercivity, Curie temperature ($T_C$), remanent magnetization ($M_r$), or Coercivity ($H_C$) is higher for the second magnetic material than the first magnetic material.

22. An electromagnetic induction device according to any one of the preceding aspects, wherein the second magnets is mechanically attached to the first magnet.

The invention claimed is:

1. A permanent magnet comprising:
a first magnetic material; and
a second magnetic material different from the first magnetic material, the second magnetic material including a north surface second magnetic material and a south surface second magnetic material, the north surface second magnetic material assembled on a north pole surface of the first magnetic material and the south surface second magnetic material assembled on a south pole surface of the first magnetic material;
wherein a polar axis of the first magnetic material is parallel with a polar axis of the second magnetic material,
wherein at least one of: a saturation magnetization ($M_S$), magnetic anisotropy ($K_u$), coefficient of temperature (CT) of magnetization, CT of Coercivity, or Curie temperature ($T_C$) is higher for the second magnetic material than the first magnetic material, and
wherein a volume of the second magnetic material is less than or equal to a volume of the first magnetic material.

2. The permanent magnet of claim 1, wherein the first magnetic material is a rectangular prism or cylindrical and the second magnetic materials are assembled on opposite ends of the rectangular prism or cylindrical first magnetic material perpendicular to a polar axis of the first magnetic material.

3. The permanent magnet of claim 2, wherein a length of each of the second magnetic materials is 1/20 the length of the permanent magnet.

4. The permanent magnet of claim 3, wherein a width of each of the second magnetic materials is equal to a width of the first magnetic material and wherein a height of each of the second magnetic materials is equal to a height of the first magnetic material.

5. The permanent magnet of claim 1, wherein:
the first magnetic material is at least one of: alnico, ferrite, a rare earth-transition metal-based permanent magnetic material, a manganese-based permanent magnetic material, a transition metal-platinum-based magnetic material, or Iron-Nitride (Fe—N); and
the second magnetic material is at least one other of: alnico, ferrite, the rare earth-transition metal-based permanent magnetic material, the manganese-based permanent magnetic material, the transition metal-platinum-based magnetic material, or Fe—N.

6. The permanent magnet of claim 1, wherein the permanent magnet has a higher magnetic flux density than a magnetic flux density of the first magnetic material.

7. The permanent magnet of claim 1, wherein at least one of: the saturation magnetization ($M_S$), magnetic anisotropy ($K_u$), coefficient of temperature (CT) of magnetization, CT of Coercivity, Curie temperature ($T_C$), remanent magnetization ($M_r$), or Coercivity ($H_C$) is optimized for the second magnetic material based on an application of the permanent magnet.

8. The permanent magnet of claim 1, wherein the second magnetic material is attached to the first magnetic material via at least one of: injection molding, compression molding, adhesion, high pressure compression, or high pressure annealing.

9. The permanent magnet of claim 1, wherein an interaction between the first and second magnetic material is exchange-coupled interaction.

10. The permanent magnet of claim 1, wherein the second magnetic material is coated, plated, or printed onto the first magnetic material.

11. An electromagnetic induction device comprising:
a rotor including an electromagnet; and
a stator surrounding the rotor and including a permanent magnet comprising:
    a first magnetic material; and
    a second magnetic material, the second magnetic material including a north surface second magnetic material and a south surface second magnetic material, the north surface second magnetic material assembled on a north pole surface of the first magnetic material and the south surface second magnetic material assembled on a south pole surface of the first magnetic material;
wherein a polar axis of the first magnetic material is parallel with a polar axis of the second magnetic material, and
wherein at least one of: a saturation magnetization ($M_S$), magnetic anisotropy ($K_u$), coefficient of temperature (CT) of magnetization, CT of Coercivity, or Curie temperature ($T_C$) is higher for the second magnetic material than the first magnetic material,
wherein a magnetic field of the stator interacts with the rotor causing the rotor to generate motion or electric current.

12. The electromagnetic induction device of claim 11, wherein the first magnetic material in the permanent magnet is a rectangular prism or cylindrical and the second magnetic materials are assembled on opposite ends of the rectangular prism or cylindrical first magnetic material perpendicular to a polar axis of the first magnetic material.

13. The electromagnetic induction device of claim 11, wherein a length of each of the second magnetic materials is 1/20 the length of the permanent magnet.

14. The electromagnetic induction device of claim 11, wherein:
the first magnetic material is at least one of: alnico, ferrite, a rare earth-transition metal- based permanent magnetic material, a manganese-based permanent magnetic material, a transition metal-platinum-based magnetic material, or Iron-Nitride (Fe—N); and
the second magnetic material is at least one other of: alnico, ferrite, the rare earth- transition metal-based permanent magnetic material, the manganese-based permanent magnetic material, the transition metal-platinum-based magnetic material, or Fe—N.

15. The electromagnetic induction device of claim 11, wherein the stator has a higher magnetic flux density than a magnetic flux density of the first magnetic material, increasing efficiency of the electromagnetic induction device.

16. The electromagnetic induction device of claim 11, wherein the second magnetic material is mechanically attached to the first magnetic material.

* * * * *